United States Patent

[11] 3,569,971

| [72] | Inventor | Leslie V. Griffee |
| | | Dallas, Tex. |
| [21] | Appl. No. | 855,682 |
| [22] | Filed | Sept. 5, 1969 |
| [45] | Patented | Mar. 9, 1971 |
| [73] | Assignee | Collins Radio Company |
| | | Dallas, Tex. |

[54] DUAL BAND CAVITY BACKED ANTENNA FOR RADIO NAVIGATION
8 Claims, 3 Drawing Figs.

[52] U.S. Cl............................................... 343/725,
343/789, 343/828, 343/853
[51] Int. Cl................................................ H01q 21/00
[50] Field of Search........................................... 343/708,
725, 729, 789, 828, 829, 830, 853, 908

[56] References Cited
UNITED STATES PATENTS
| 3,239,838 | 3/1966 | Kelleher | 343/789 |
| 3,261,018 | 7/1966 | Mast | 343/789 |

*Primary Examiner*—Eli Lieberman
*Attorneys*—Henry K. Woodward and Robert J. Crawford

ABSTRACT: A radio navigation antenna operable in either the P communication band or the L communication band. A housing mountable in a rotatable support means in the body of an aircraft accommodates a planar P band radiating element and a pair of L-band folded monopoles such that interference is minimized among the radiating elements and 180° radiation patterns may be generated by the respective radiating elements.

PATENTED MAR 9 1971  3,569,971

INVENTOR.
LESLIE V. GRIFFEE

BY  H. K. Woodward

ATTORNEY 3,569,971

DUAL BAND CAVITY BACKED ANTENNA FOR RADIO NAVIGATION

BACKGROUND OF THE INVENTION

This invention relates generally to electrical antennas, and more particularly to radio navigation antennas as used in aircraft, for example.

A number of radio navigation systems are employed today as aids in aviation and maritime navigation. Many of the aviation navigation systems, both commercial and military, are operated in the P-band in the VHF and UHF ranges (225—400 MHz.) and the L-band in the UHF range (960—1220 MHz.).

Up to the present, aviation equipment has been designed to be compatible with specific or a limited number of radio navigation systems. Avionic antennas, for example, are limited in frequency response. The AS—909/ARA—48 antenna functions over the entire P-band, but is restricted thereto.

With increasing usage of both the P-and L-bands in aviation navigation, it is desirable to have avionics equipment which is functional in both of these frequency bands.

SUMMARY OF THE INVENTION

Accordingly, an object of this invention is an improved radio navigation antenna especially useful in aviation.

Another object of this invention is a radio navigation antenna which is operable over a wide frequency range.

Yet another object of the invention is an avionics radio navigation antenna operable in either P-band or L-band.

Another object of the invention is a radio navigation antenna having L-band responsive elements in close proximity with a P-band responsive element with sufficient electrical isolation therebetween to minimize mutual coupling.

Briefly, the radio navigation antenna in accordance with the present invention includes a support cavity which may be rotatably mounted in the body of an aircraft. The cavity supports a planar P-band radiating element which is positioned across the opening of said cavity and a pair of L-band folded monopoles which are supported from the bottom of said cavities and positioned intermediate a slot in said planar P-band element. Electrical feeds are provided near the opening of said cavity for the P-band element while electrical feeds are provided through the bottom of said cavity for the L-band elements.

The invention and objects and features thereof will be more fully understood from the following detailed description and appended claims when taken with the drawings.

DETAILED DESCRIPTION OF ONE EMBODIMENT

Figure 1:
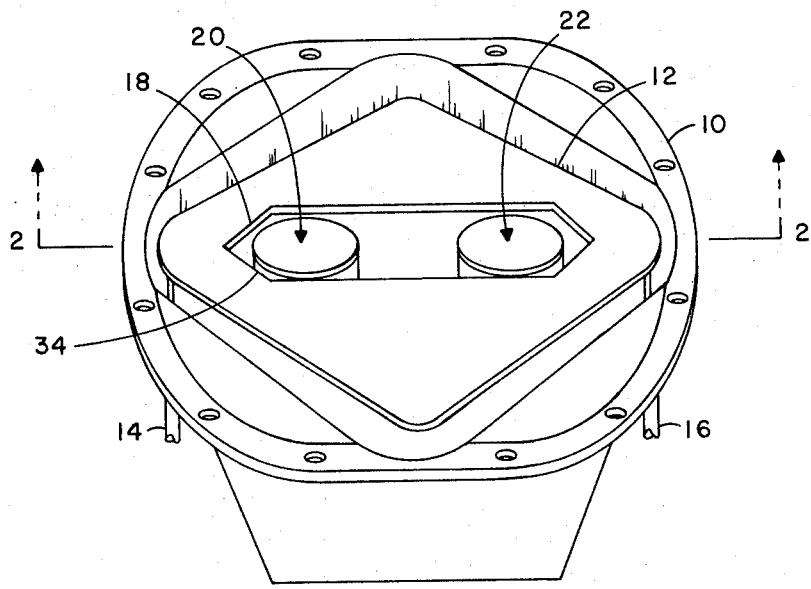
FIG. 1 is a perspective view of one embodiment of the invention.

Referring now to the drawings, FIG. 1 is a perspective view of an antenna in accordance with the present invention. The antenna includes a housing 10 which defines a cavity in which the radiating elements are mounted. Housing 10 is mounted in a rotatable support means in the body of an aircraft. The P-band radiating element comprises a planar member 12 of generally parallelogram configuration and which is mounted to housing 10 at opposing corners by electrical feed members 14 and 16. Intermediate the opposing corners of planar member 12 is an elongated opening 18 of a generally hexagonal configuration. Mounted within housing 10 and centered in spaced alignment with opening 18 are two folded monopole radiating elements 20 and 22 which are designed to function in the L-band.

Figure 2:
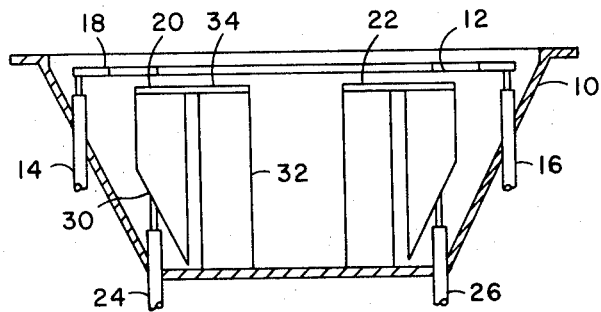
FIG. 2 is a section view of the antenna in FIG. 1 taken along the lines 2–2.

The folded monopole L-band elements 20 and 22 are better illustrated in the cross section view in FIG. 2 taken along the line 2–2 in FIG. 1. Each folded monopole is mounted to the bottom surface of housing 10 and electrical R–F inputs 24 and 26 are provided to feed the monopoles. With reference to monopole 20, each of the folded monopoles comprises spaced planar sections 30 and 32 with a planar section 34 electrically and mechanically connecting ends of sections 30 and 32. The opposite end of section 30 is connected to feed 24, and the opposite end of section 32 is mounted to the bottom surface of housing 10. Normally, section 34 is coplanar with the P-band radiating element 10 and positioned within slot 18, but for illustration purposes, section 34 is shown slight below element 12 in FIG. 2. Referring again to FIG. 1, it will be noted that section 34 has a generally elongated planar configuration. All radiating elements may be brass, aluminum or like electrically conductive material.

While both the P-band and L-band elements may be fed simultaneously, in normal operation this would not be employed, as such operation would not be compatible with ADF systems. That is, automatic direction finding would be with respect to only one station at a time; therefore, the appropriate element would be employed which is compatible with the ADF systems of the particular station. When operating in the P-band mode, planar element 12 is alternately fed from inputs 14 and 16 with the opposite input terminated in a 50 ohm load in order to generate alternate 180° patterns. This mode of operation is very similar to the operation of the standard AS—909/ARA—48 antenna.

Figure 3:
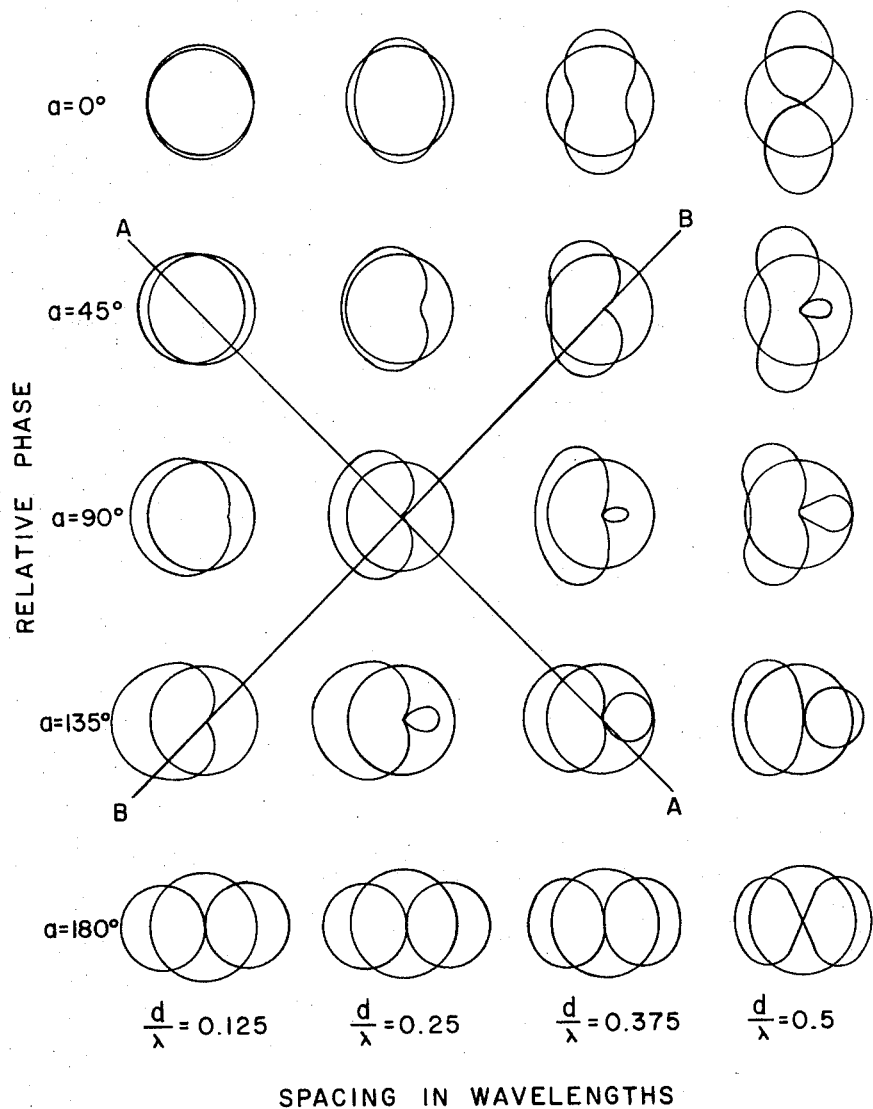
FIG. 3 is plots of radiation patterns and illustrates design considerations in the present antenna.

The two L-band folded monopole elements are spaced and phased to produce a left or right cordiod pattern as the two monopole elements are alternately connected to a transceiver. Dielectric loading is employed to reduce the electrical size of the monopole elements. The degree to which a cordiod pattern is obtained is a function of spacing and phasing of the two monopole elements as shown in FIG. 3. The various rows of radiation patterns are related to relative phase between the monopole elements, and the various columns are related to electrical spacing in wavelengths of the two monopole elements. When the phasing is made to vary directly with frequency, the antenna pattern behavior follows along the line marked A–A in the drawing, departing quite rapidly from a cordiod on either side of the 90° phasing condition. This behavior is undesirable as the operating frequency range is restricted. However, if the phasing varies inversely as the frequency a cordiod pattern is maintained over a much greater bandwidth as shown by line B–B. Achieving this greater bandwidth can be accomplished by inserting a 180° phase shift by hybrid means in addition to the normal phase shift. However, it has been found that when the operating frequency in the L-band is limited to a narrow range of 1025 to 1150 MHz., for example, it is not necessary to introduce this additional phase shift.

It is to be noted that the P-band radiation element 12 is fed near the opening of housing 10 while the L-band elements 20 and 22 are fed from near the bottom of housing 10. This facilitates electrical isolation and minimizes interference between the two bands. Solid-state switching is preferably employed to achieve right and left antenna patterns for either the L-band or P-band. A triaxial R–F rotating joint may be used for feeding the L-band and P-band element; however, this method is rather costly and is unnecessary if the L-band and P-band elements are not to be used simultaneously. A less expensive method of feeding the elements is by use of a coaxial antenna selector switch located in the rotatable support means. This does require the addition of a slipring for transferring switching information to the moving elements. A preferable approach employs the use of a high pass-low pass diplexor built into the rotatable suport means with the radiating element inputs diplexed onto one coaxial line.

The described antenna has proven to be very successful in extending the frequency range of a radio navigation system. Further, the L-band and P-band elements may be mounted in the conventional antenna housing and operated with the drive mechanism of the conventional AS-909/ARA-48 antenna. While the invention has been described with reference to a specific embodiment, the description is illustrative and not to be construed as limiting the scope of the invention. Various modifications and changes may occur to those skilled in the art without departing from the spirit and scope of the invention.

I claim:

1. A radio navigation antenna comprising a housing defining a cavity having an open end and a closed end, a planar radiating element mounted across said open end, said planar radiating element having an elongated opening in an intermediate portion, and a pair of folded monopole elements mounted in said cavity near said closed end and having intermediate portions essentially coplanar with said planar radiating element and positioned in said elongated opening.

2. A radio navigation antenna as defined by claim 1 wherein said planar radiating element functions in the P-band and said pair of folded monopole elements function in the L-band.

3. A radio navigation antenna as defined by claim 1 and including feed means for electrically feeding said planar radiating element, said feed means being mounted in said housing near said open end.

4. A radio navigation antenna as defined by claim 1 and including feed means for electrically feeding each of said folded monopole elements, said feed means being mounted in said housing near said closed end.

5. A radio navigation antenna as defined by claim 1 and including first feed means for electrically feeding said planar radiating element, said first feed means being mounted in said housing near said open end, and second feed means for electrically feeding each of said folded monopole elements, said second feed means being mounted in said housing near said closed end.

6. A radio navigation antenna as defined by claim 5 wherein said folded monopole elements are phased at approximately 180 electrical degrees.

7. A radio navigation antenna as defined by claim 1 wherein said folded monopole elements are phased at approximately 180 electrical degrees.

8. A radio navigation antenna compatible with aviation navigation systems operating in the P-band and L-band comprising a housing defining a cavity and having an open end and a closed end, a planar radiating element mounted across said open end and designed to function in said P-band, an elongated opening in an intermediate portion of said planar radiating element, feed means mounted in said housing near said open end for electrically feeding said planar radiating element at two opposing points on the periphery thereof, a pair of folded monopole elements mounted in said cavity having intermediate portions essentially coplanar with said planar radiating element and positioned in said elongated opening, said folded monopole elements designed to function in said L-band, and feed means mounted in said housing away from said open end for electrically feeding said folded monopoles.